No. 742,005. PATENTED OCT. 20, 1903.
P. B. CLARKE.
VERTICAL STOKER SCALE.
APPLICATION FILED APR. 29, 1901.
NO MODEL. 10 SHEETS—SHEET 1.

Witnesses

P. B. CLARKE Inventor
By C. A. Snow & Co.
Attorneys

No. 742,005. PATENTED OCT. 20, 1903.
P. B. CLARKE.
VERTICAL STOKER SCALE.
APPLICATION FILED APR. 29, 1901.
NO MODEL. 10 SHEETS—SHEET 3.

Witnesses
P. B. CLARKE, Inventor
Attorneys

No. 742,005. PATENTED OCT. 20, 1903.
P. B. CLARKE.
VERTICAL STOKER SCALE.
APPLICATION FILED APR. 29, 1901.
NO MODEL. 10 SHEETS—SHEET 4.

P. B. CLARKE, Inventor

No. 742,005. PATENTED OCT. 20, 1903.
P. B. CLARKE.
VERTICAL STOKER SCALE.
APPLICATION FILED APR. 29, 1901.
NO MODEL. 10 SHEETS—SHEET 5.

P. B. CLARKE
Inventor

Witnesses

Attorneys

No. 742,005. PATENTED OCT. 20, 1903.
P. B. CLARKE.
VERTICAL STOKER SCALE.
APPLICATION FILED APR. 29, 1901.
NO MODEL. 10 SHEETS—SHEET 6.

Witnesses
P. B. CLARKE, Inventor
Attorneys

No. 742,005. PATENTED OCT. 20, 1903.
P. B. CLARKE.
VERTICAL STOKER SCALE.
APPLICATION FILED APR. 29, 1901.
NO MODEL. 10 SHEETS—SHEET 7.

Witnesses

P. B. CLARKE, Inventor
Attorneys

P. B. CLARKE
Inventor

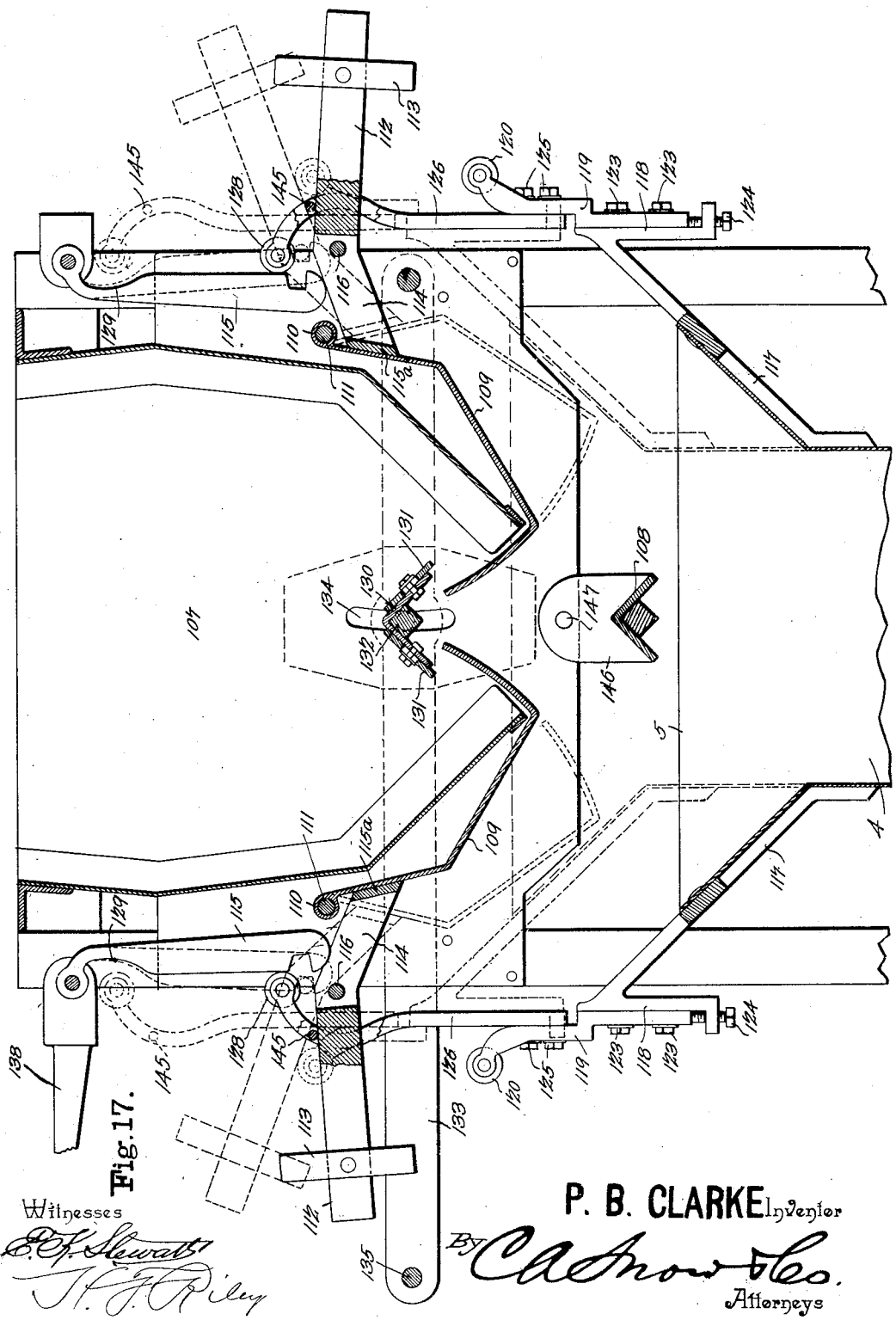

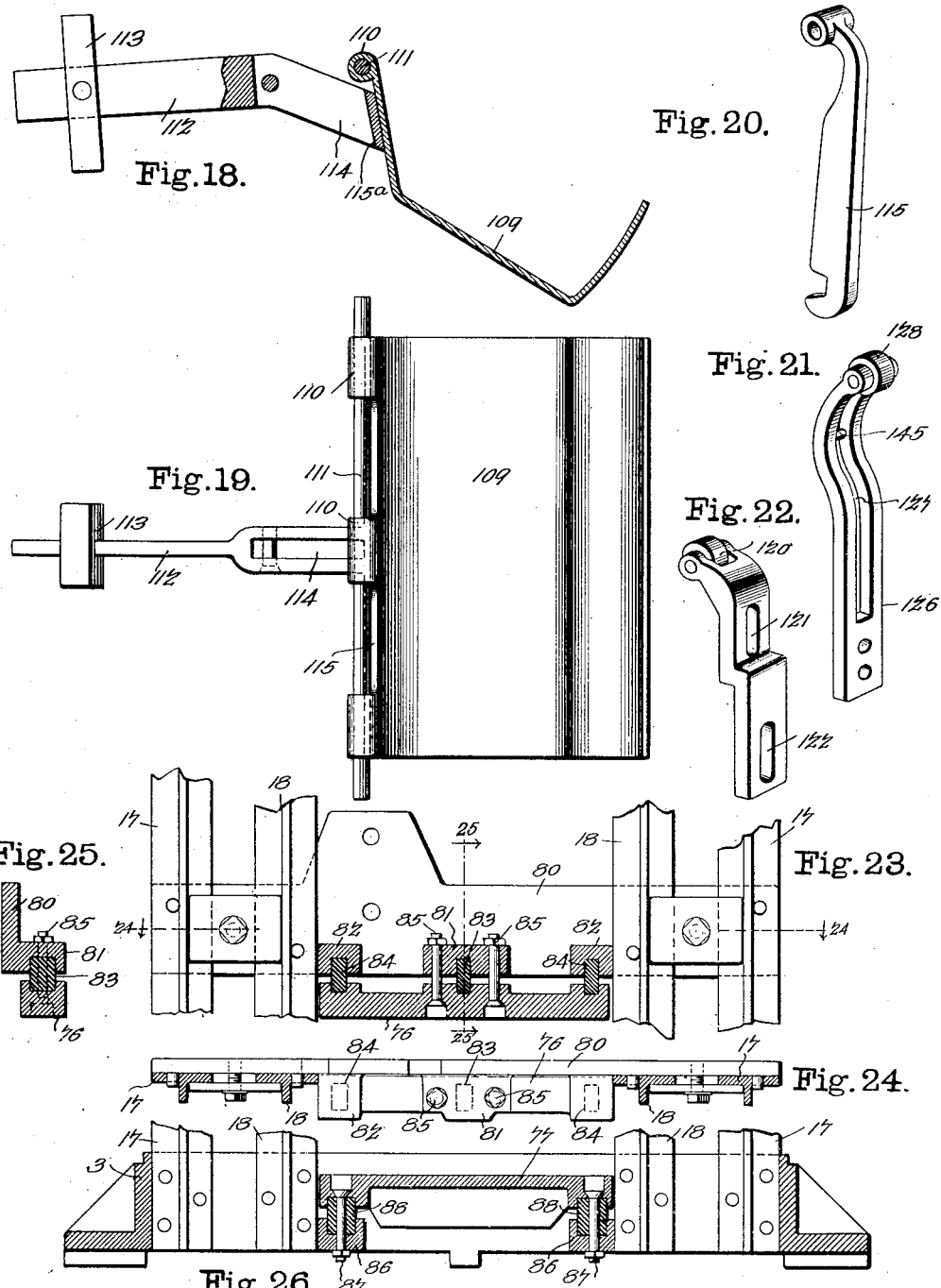

No. 742,005. Patented October 20, 1903.

UNITED STATES PATENT OFFICE.

PEETE B. CLARKE, OF NEW YORK, N. Y.

VERTICAL STOKER-SCALE.

SPECIFICATION forming part of Letters Patent No. 742,005, dated October 20, 1903.

Application filed April 29, 1901. Serial No. 57,995. (No model.)

*To all whom it may concern:*

Be it known that I, PEETE B. CLARKE, a citizen of the United States, residing at New York, in the county of New York and State of New York, have invented a new and useful Vertical Stoker-Scale, of which the following is a specification.

The invention relates to a vertical stoker-scale.

The object of the present invention is to improve the construction of automatic scales, more especially that shown and described in the application filed by me on or about May 26, 1898, Serial No. 681,798, and to increase the efficiency and accuracy of the same and to provide a simple and comparatively inexpensive one designed more especially for use as a stoker-scale for measuring coal as it is consumed and adapted to be readily operated by a fireman or other person for delivering successive charges of the coal, as desired.

A further object of the invention is to provide a simple and efficient device for insuring a single operation of the automatic scale each time the operating mechanism is actuated in order to prevent any liability of the scale accidentally operating continuously.

The invention also has for its object to provide a scale of this character which will be capable of operating continuously and of accurately weighing coal or other material.

The invention consists in the construction and novel combination and arrangement of parts hereinafter fully described, illustrated in the accompanying drawings, and pointed out in the claims hereto appended.

Figure 1:
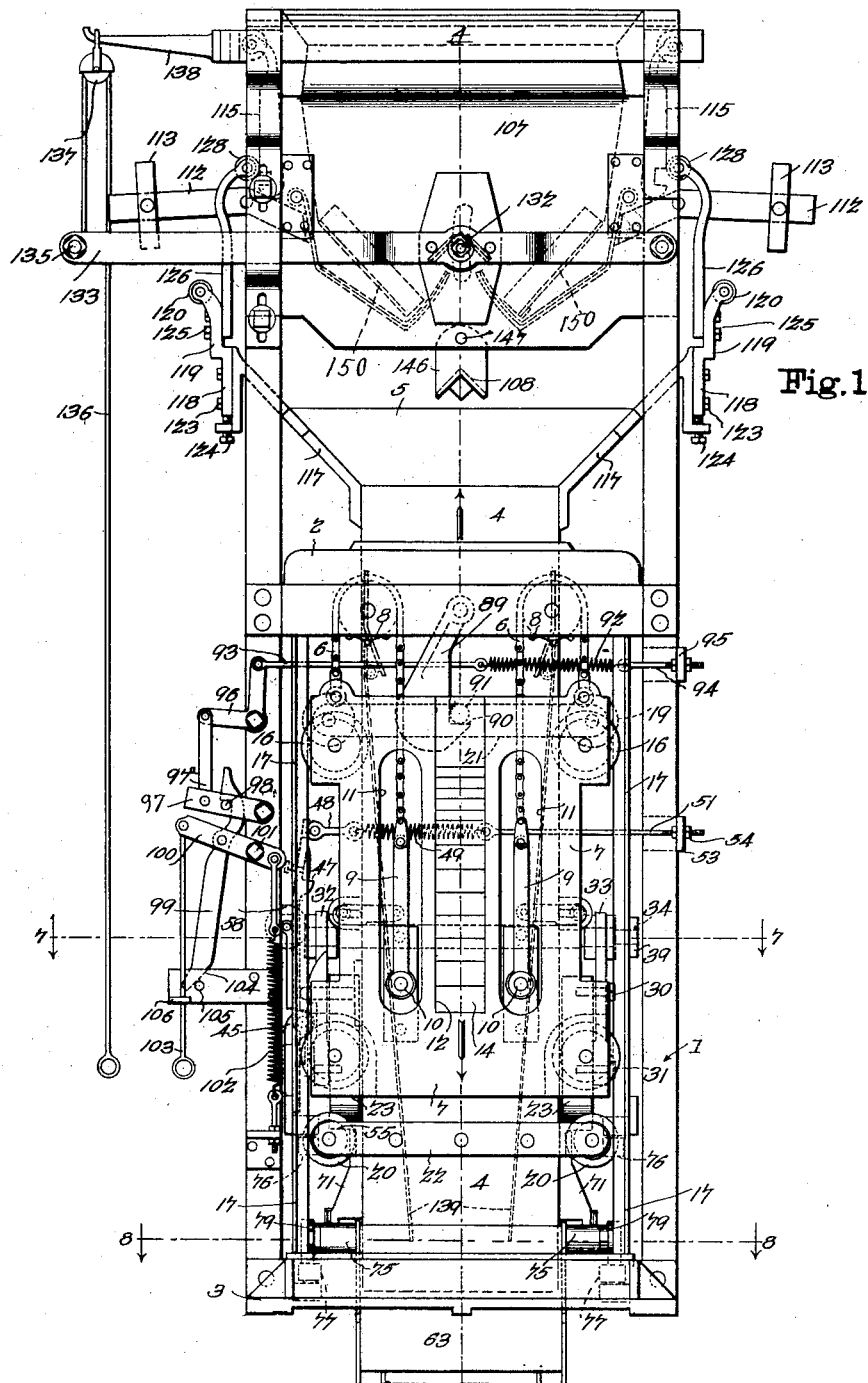
Figure 2:
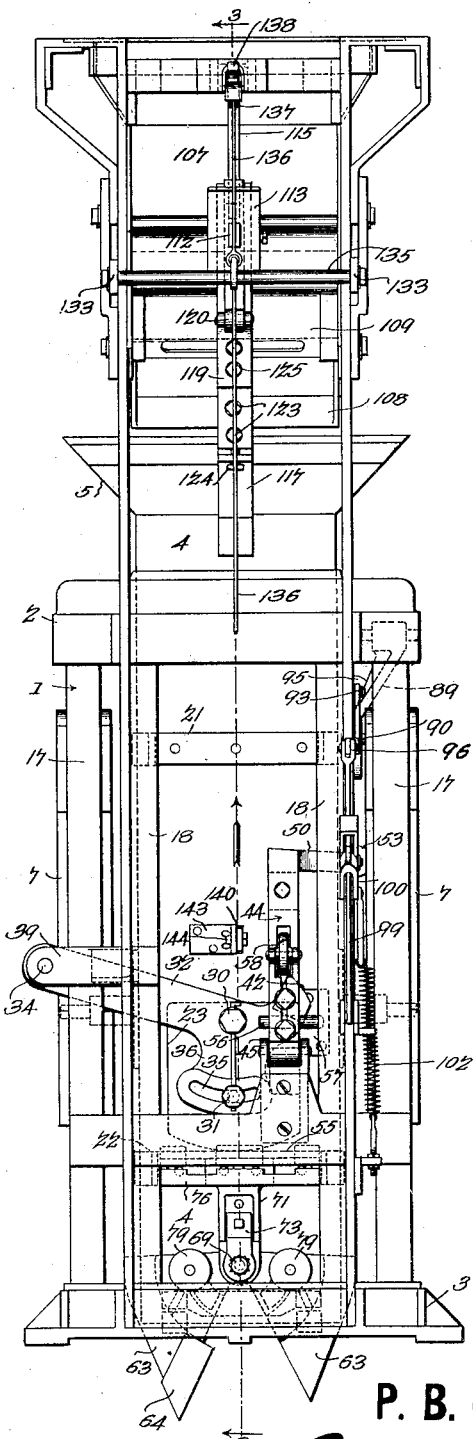
Figure 3:
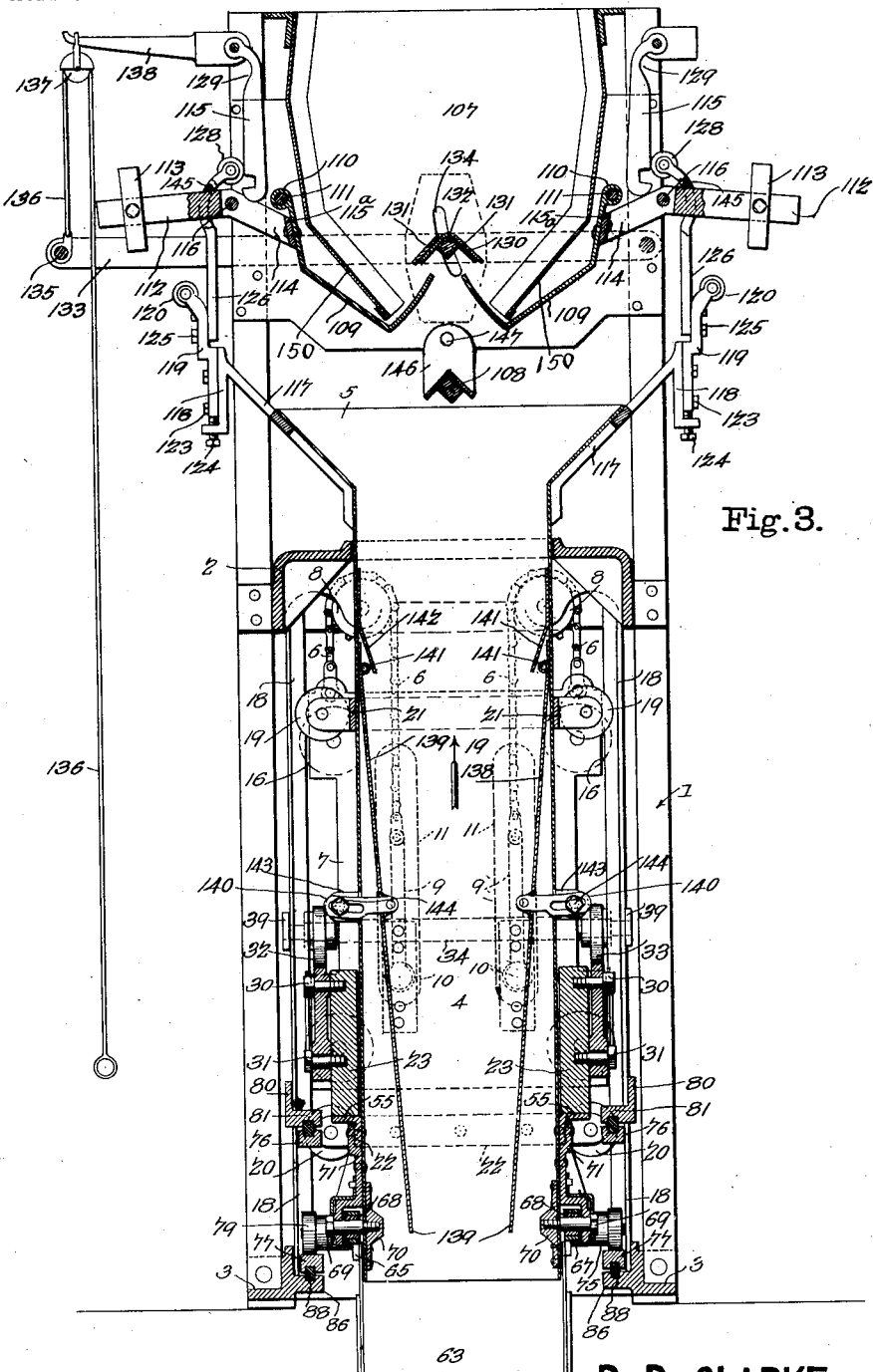
Figure 4:
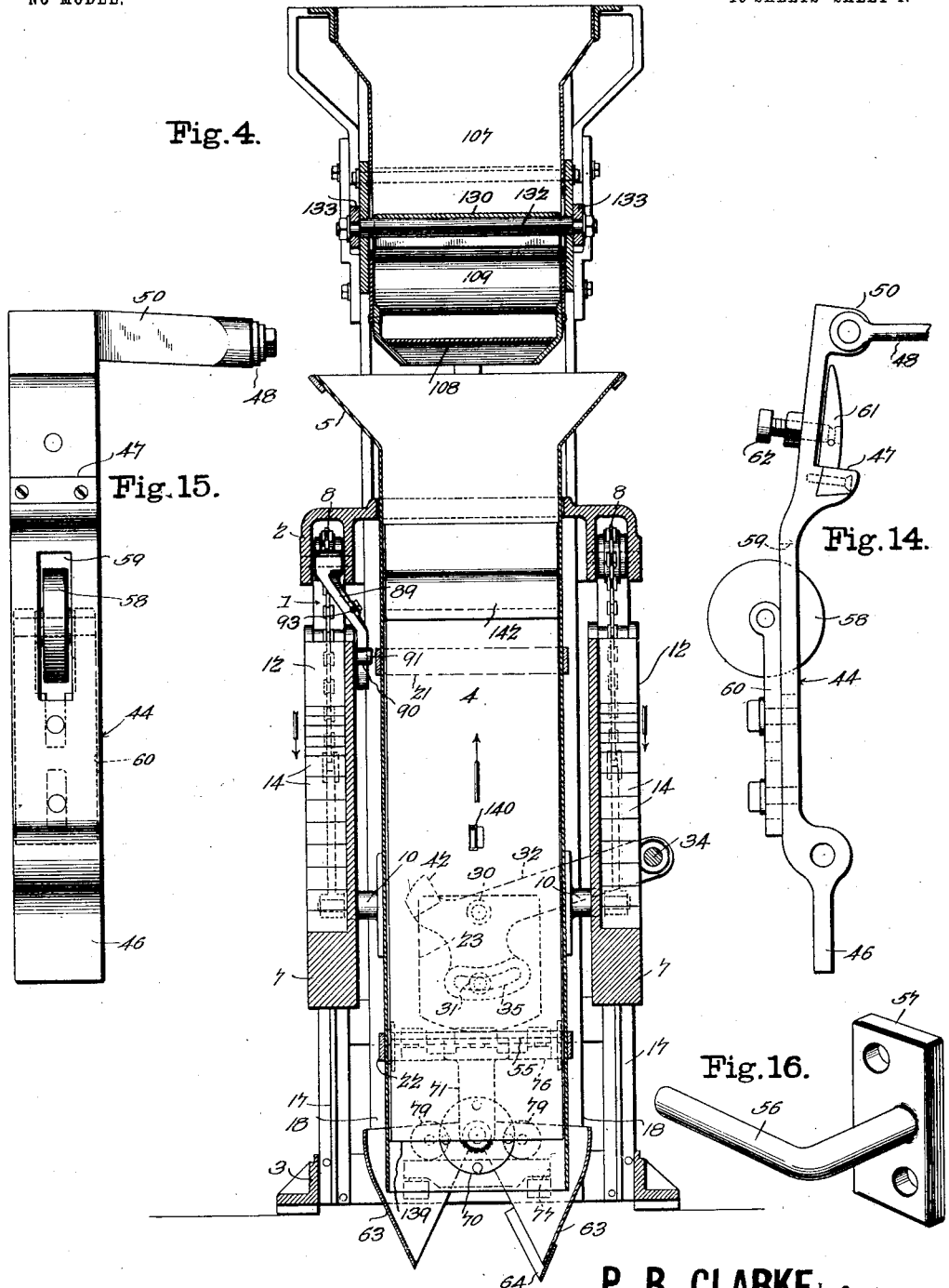
Figure 5:
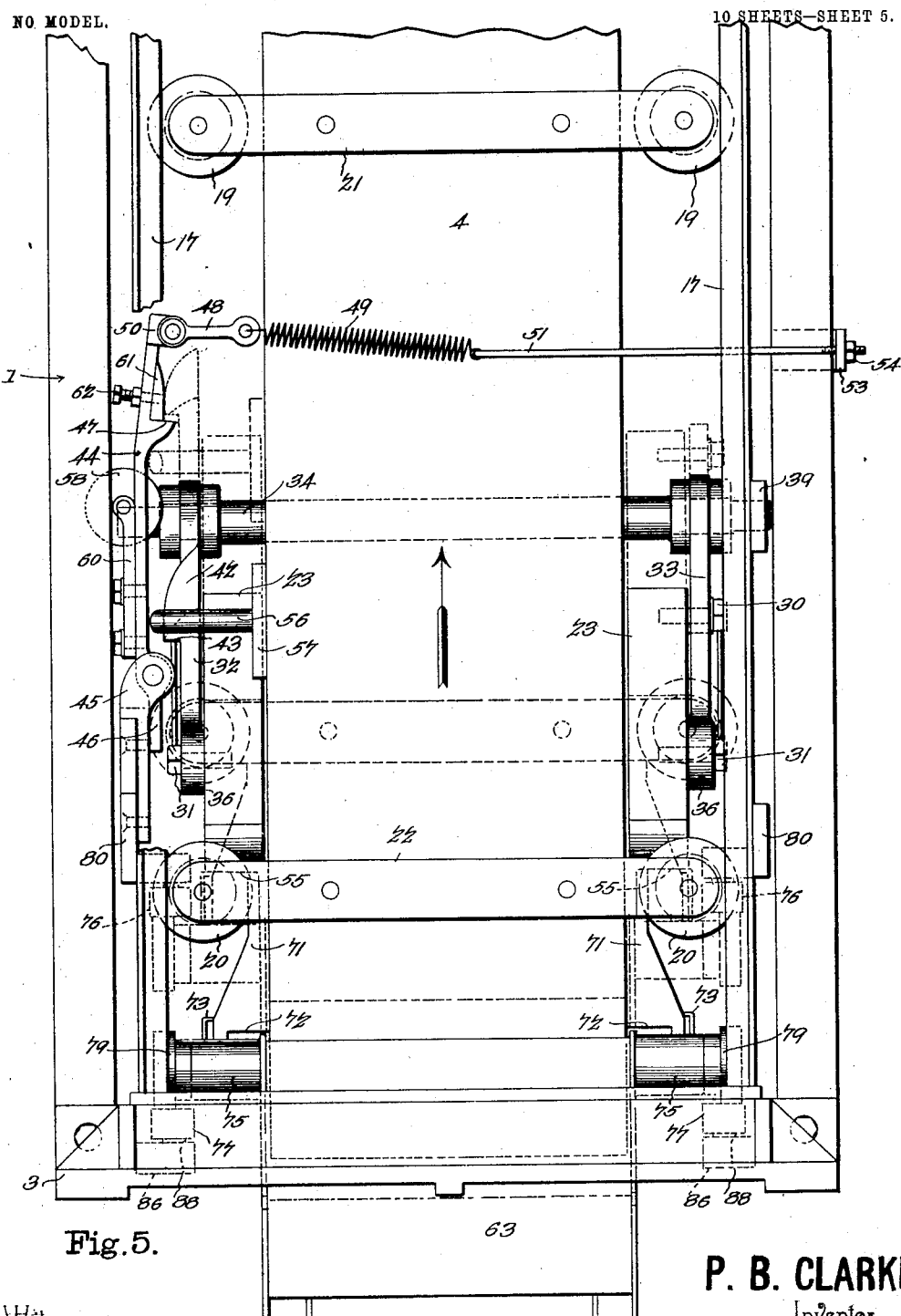
Figure 6:
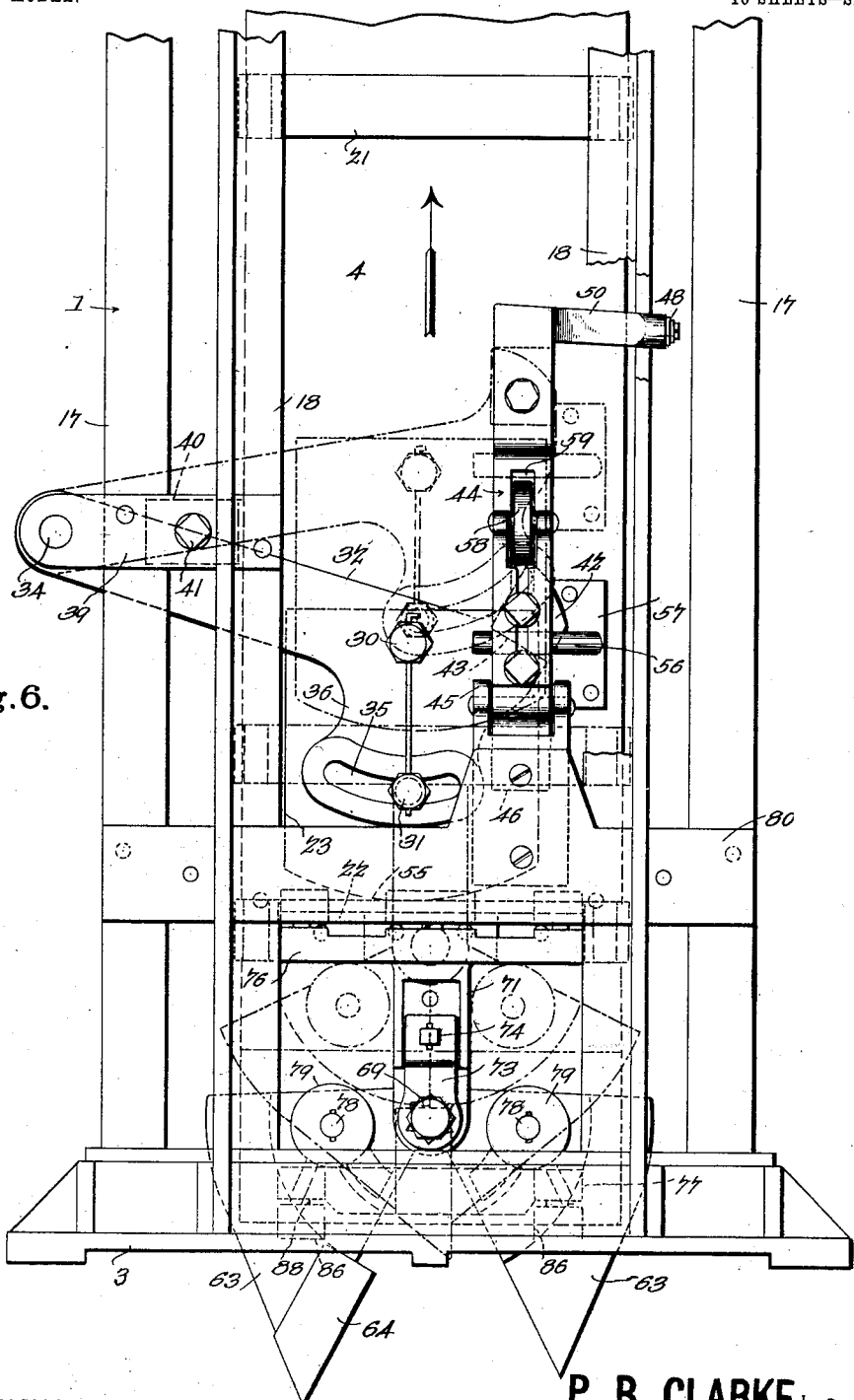
Figure 7:
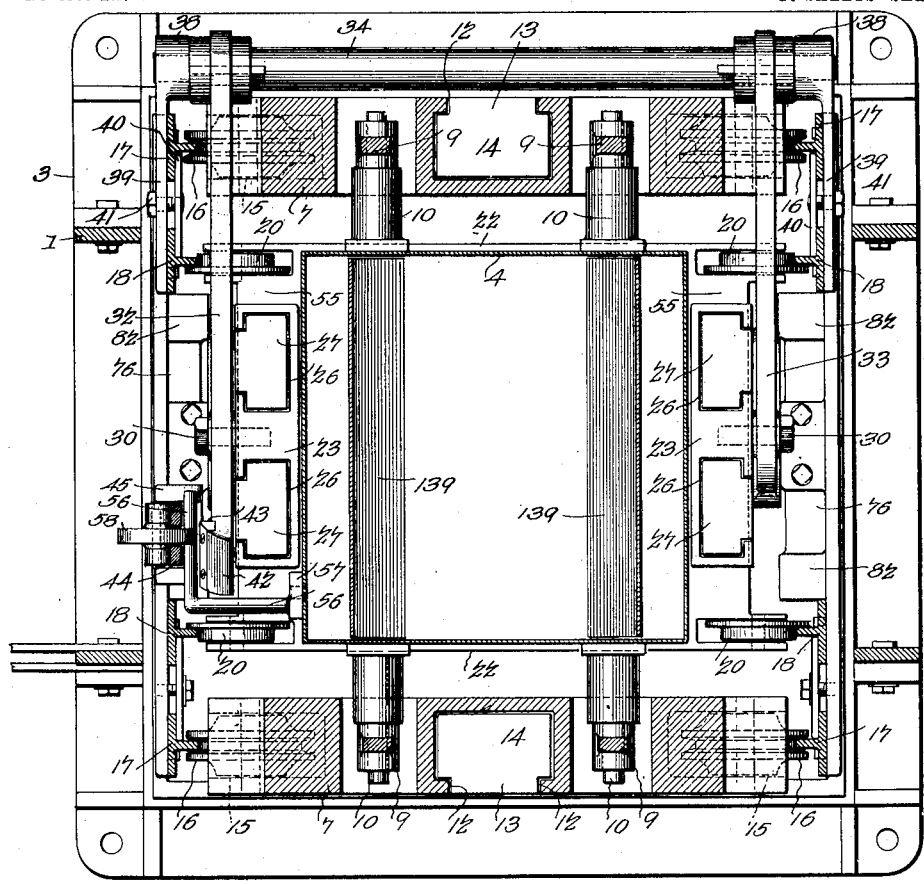
Figure 11:
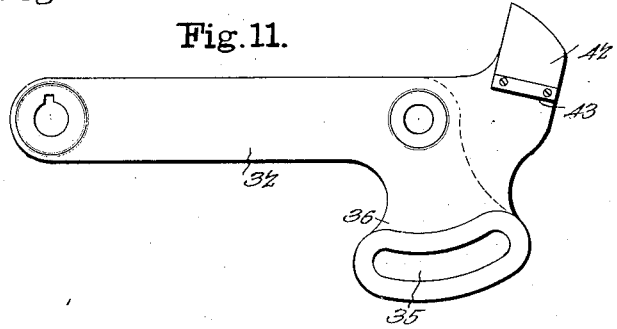
Figure 13:
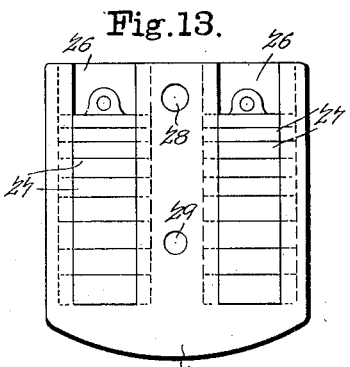
Figure 12:
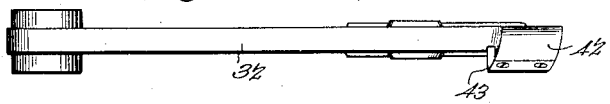
Figure 8:
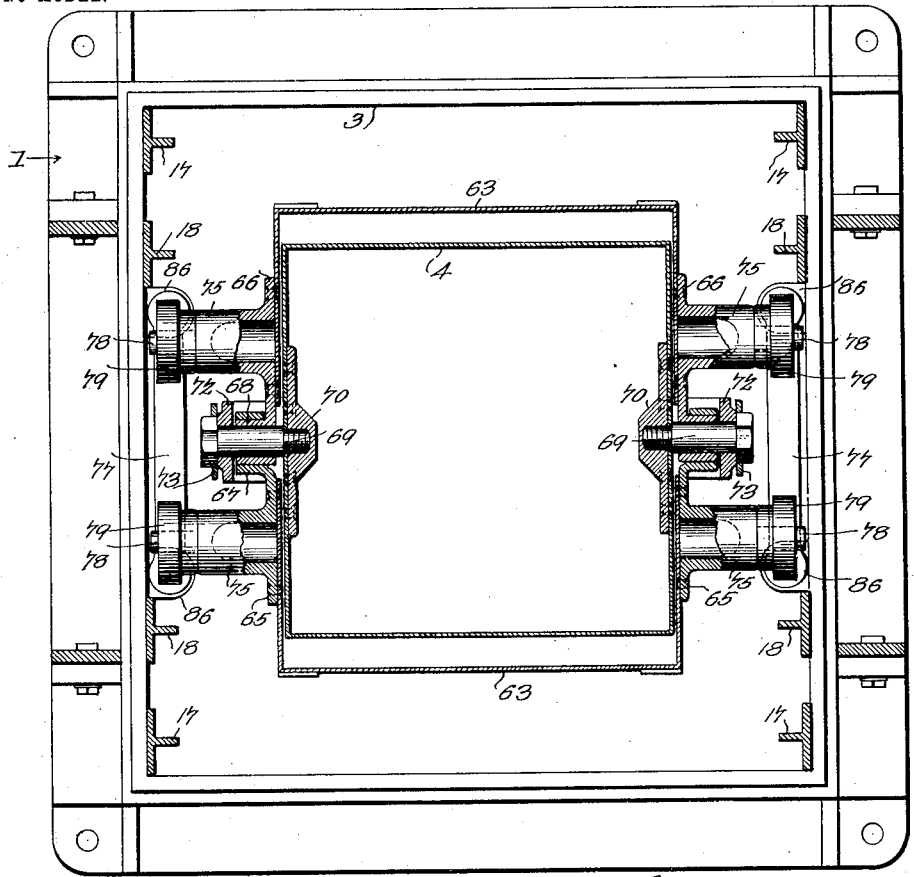
Figure 9:
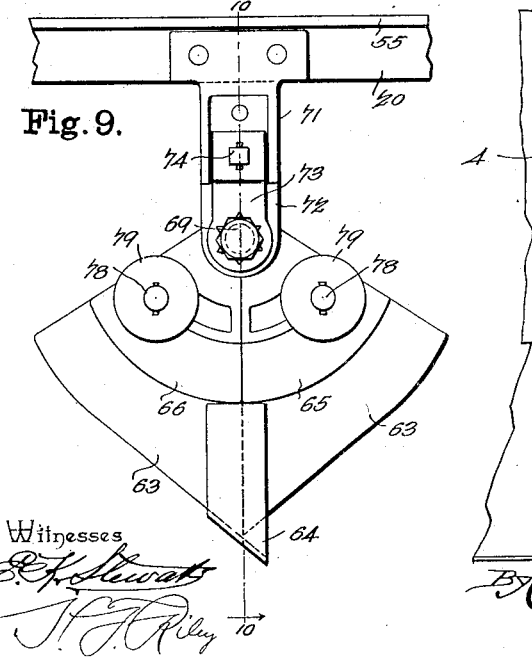
Figure 10:
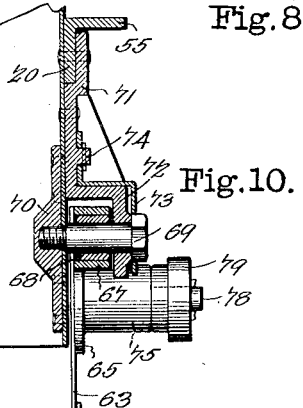

In the drawings, Figures 1 and 2 are elevations of an automatic stoker-scale constructed in accordance with this invention and illustrating the arrangement of the parts when the scale is locked against operation. Fig. 3 is a vertical sectional view on line 3 3 of Fig. 2. Fig. 4 is a vertical sectional view on line 4 4 of Fig. 1. Figs. 5 and 6 are enlarged elevations of the lower portion of the scale, illustrating the construction of the supplemental weights and the means for supporting and tripping the same, the scale-weights being omitted. Fig. 7 is a horizontal sectional view on the line 7 7 of Fig. 1. Fig. 8 is a horizontal sectional view on the line 8 8 of Fig. 1. Figs. 9 and 10 are detail views illustrating the construction for hinging the gates at the bottom of the bucket or load-receiver. Figs. 11 and 12 are detail views of the arm for supporting the supplemental weights after the bucket or load-receiver has received a portion of a charge and before the poising-point is reached. Fig. 13 is a detail view of one of the supplemental weights. Figs. 14 and 15 are detail views illustrating the construction of the catch for holding the supplemental weights. Fig. 16 is a detail perspective view of the device for tripping the catch. Fig. 17 is an enlarged sectional view of the upper portion of the scale, illustrating the construction of the cut-offs and the means for controlling the same. Figs. 18 and 19 are detail views of one of the cut-offs. Fig. 20 is a detail view of one of the catches for holding the cut-offs open. Figs. 21 and 22 are detail views illustrating the construction of the devices for opening and tripping the cut-offs. Fig. 23 is a detail view illustrating the construction of the upper buffer for closing the gates at the bottom of the bucket or load-receiver. Fig. 24 is a sectional view on the line 24 24 of Fig. 23. Fig. 25 is a vertical sectional view on the line 25 25 of Fig. 23. Fig. 26 is a detail sectional view illustrating the arrangement of the lower buffers.

Like numerals of reference designate corresponding parts in all the figures of the drawings.

1 designates a supporting-frame approximately rectangular in cross-section and preferably composed of upright angle-iron or channel-iron beams and suitable connecting-bars, and the latter may be formed by upper and lower rectangular frames 2 and 3. The rectangular frames, which are composed of sides or bars formed integral with one another, are arranged at a point between the top and bottom of the supporting-frame and at the bottom of the latter, as clearly illustrated in Figs. 3 and 4 of the accompanying drawings. Within the supporting-frame is arranged a vertically-movable load-receiver or bucket 4, constructed of sheet-metal or other suitable material and having a flaring top 5 and provided at its bottom with a pair of hinged gates, which are adapted to open and close automatically when the load-receiver or bucket moves vertically, as hereinafter explained. The load-receiver or bucket, which is adapted to move vertically in the direction of the arrow from the position illustrated in Fig. 4 of the drawings, is connected by chains 6 or other flexible connections with scale-weights 7, located at opposite sides of the scale, as clearly shown in Fig. 4. The chains 6 are arranged in pairs and mesh with supporting chain or sprocket wheels 8, arranged in pairs and mounted within the opposite sides of the upper horizontally-disposed rectangular frame 2. The sides of the upper rectangular frame 2 form housings for the chain or sprocket wheels, and the chains 6, which depend from the sprocket or chain wheels, are secured at their outer ends to the top of the scale-weights at opposite sides thereof, and the inner ends of the chains extend downward and are connected by link bars or hangers 9 with the vertically-movable load-receiver or bucket. The vertically-movable load-receiver or bucket is provided at opposite sides with suitable projections or studs 10 to receive the lower ends of the link bars or hangers 9, and the scale-weights, which consist of heavy rectangular plates, are provided with vertical openings 11, receiving the projections or studs 10 of the vertically-movable load-receiver or bucket. The heavy plates, which constitute the body portion of the scale-weights, are provided between the vertical openings with central vertical sockets 12 and have vertical slots or openings in the front or outer walls of the sockets to receive projections 13 of removable weights 14, which are adapted to be placed in the sockets to vary the effect of the scale-weights and to enable a charge of the exact amount to be weighed by the scale. By these removable weights any variation in the weight of the vertically-movable bucket, the scale-weights, and other parts may be readily corrected. The scale-weights, which have side recesses or cut-away portions, are provided at the top and bottom of the same with grooves or recesses 15, in which are mounted grooved guide-wheels 16, arranged to run on outer vertical guides 17 of the supporting-frame, which is also provided with inner guides 18 for upper and lower guide-wheels 19 and 20 of the vertically-movable load-receiver or bucket. The inner and outer guides of the supporting-frame consist of flanges of the uprights or beams of the said frame 1, and the guide-wheels of the scale-weights and the vertically-movable bucket or load-receiver enable the parts to move freely and frictionlessly. The load-receiver or bucket is provided with upper and lower belts or bands, which are provided with projections or ears between which the upper and lower guide-wheels 19 and 20 are mounted. Instead of employing belts or bands 21 and 22 any other suitable means may be provided for supporting the guide-wheels 19 and 20. The scale-weights are provided at their tops with bores or openings communicating with the vertical openings 11 and receiving the inner depending portions of the chains or other flexible connections. The scale-weights normally maintain the load-receiver or bucket in an elevated position when the latter is free to move vertically, as it is designed to be locked by means, hereinafter described, against such vertical movement to hold the scale out of operation. When the scale is free to operate, the scale-weights will maintain the load-receiver or bucket in an elevated position until they are counterbalanced by a charge of material, when the said load-receiver or bucket will move downward under the influence of such charge and also under the influence of supplemental weights 23 in a manner similar to the load-receiver or bucket shown and described in the said application. These supplemental weights, which preferably consist of heavy plates, are provided with opposite sockets or wells 26 and are designed during the first portion of the weighing operation to partially counterbalance the scale-weights to cause the load-receiver or bucket to commence its descent before it has received a full charge, and the said supplemental weights are then temporarily supported by the means hereinafter described until the load-receiver or bucket has received a full charge, when they are tripped and caused to fall upon the load-receiver or bucket to impose an additional weight upon the same when the poising-point is reached, whereby an additional downward impetus is imparted directly to the said load-receiver or bucket to cause a rapid operation of the scale and to produce a positive and effective operation of the cut-offs hereinafter described. The supplemental weights are located at the sides of the load-receiver or bucket where the scale-weights are not placed, and the sockets or wells 26, which are arranged vertically, are located at opposite sides of the center of the supplemental weights and are provided with removable weights 27, which may be varied in number to enable a supplemental weight of the desired heft to be obtained.

Between the vertical weight-receiving sockets or wells are arranged upper and lower perforations 28 and 29, receiving an upper pivot 30 and a lower fastening device 31 for connecting the supplemental weights with a pair of arms 32 and 33 of a shaft 34, located at one side of the supporting-frame and keyed or otherwise secured to the said arms, whereby the latter will oscillate in unison when the shaft is partially rotated. The arms 32 and 33 are provided with upper perforations to receive the pivots, and they have lower curved slots 35 receiving the fastening devices 31 and permitting the necessary lateral movement of the depending portions 36 of the arms in which the said slots are formed. The depending portions of the arms are moved laterally of the supplemental weights when the arms swing upward and downward, as clearly illustrated in Fig. 6 of the accompanying drawings, and the supplemental weights have a slight lateral movement or play, as indicated; but this lateral movement, owing to the position of the pivots with relation to the swing of the arms, is so very slight that the weights may be permitted to move bodily. The horizontal shaft 34 is journaled at its ends in suitable bearings 38, provided with plates or arms 39, extending horizontally across the adjacent uprights or beams and secured to the same by clamps consisting of clamping-plates 40 and adjusting-screws 41. The arms 39 of the bearings are located at the outer faces of the uprights or beams, as clearly illustrated in Fig. 7. The clamping-plates 40 are arranged at the inner faces of the latter and are located between the adjacent guide-flanges, and the adjusting-screws 41 are located between the said uprights or beams. When the supplemental weights move vertically, the arms are oscillated, and as the latter are fixed to the shaft 34 the weights 23 will move uniformly. The sockets or wells 26 of the supplemental weights 23 are constructed similar to the sockets or wells of the scale-weights, and the removable weights 27 are provided with front or outer projecting portions which fit in the front slots or openings and which have their outer edges flush with the outer faces of the supplemental weights.

The arm 32 is provided with a beveled tooth or head 42, presenting an inclined or beveled side face and having a lower shoulder 43, which is adapted to be engaged by a spring-actuated catch 44, whereby the supplemental weights are supported in an elevated position. The spring-actuated catch consists of a lever fulcrumed on a suitable bracket or support 45 at a point between its ends, preferably near its lower end, and having a short lower arm 46, arranged to engage the bracket or support and located at the inner face of the same and adapted to limit the inward movement of the upper portion or arm of the lever, which upper portion or arm forms the body portion of the catch. The catch, which is provided near its upper end with a shoulder or ledge 47, is beveled beneath the same and is connected at its upper end by a link 48 with a spring 49. The spring 49 is located in the space between the vertically-movable load-receiver or bucket and the adjacent side of the frame, and the catch is provided at its top with a laterally-extending arm 50, at the outer end of which is arranged the link 48. The outer end of the arm 50 is located at the said space between the load-receiver or bucket and the side of the supporting-frame, and the inner end of the spring is connected with the latter by a rod 51. The rod 51, which has its outer end threaded, extends through an opening of a bracket 53 and is provided at the inner and outer face of the same with nuts 54, by means of which the spring may be adjusted to stretch the same to the desired tension.

The beveled head or tooth of the arm 32 may be provided at its shoulder with a suitable wear-plate, which may be renewed when worn, and the catch 44 is also preferably provided at its supporting ledge or shoulder 47 with a removable wear plate or shoe.

After the vertically-movable load-receiver or bucket has discharged its contents, as hereinafter explained, and is free to move vertically it is carried upward by the scale-weights, which also move the supplemental weights vertically, the said load-receiver or bucket being provided with supporting ledges or flanges 55, preferably formed integral with the lower band or belt 22, as clearly shown in Fig. 3 of the accompanying drawings. The engaging portion of the arm 32 is held slightly above the supporting ledge or shoulder 47 of the catch 44 while the load-receiver or bucket is receiving the main portion of its contents and until the weight of the charge and the supplemental weights are sufficient to counterbalance the scale-weights, and the said bucket or receiver will then commence to descend and will fall until the engaging portion or head of the arm 32 rests upon the supporting ledge or shoulder 47. This is effected by a slight downward movement of the load-receiver or bucket, and after the latter has received its full charge it commences to descend, and such downward movement automatically trips the supplemental weights which fall upon the bucket or load-receiver, thereby imposing directly on the same an additional weight when the poising-point is reached, whereby an additional downward impetus is imparted to the said load-receiver or bucket. This produces a sudden, sharp, and positive operation of the scale, and the material is thereby accurately weighed and is prevented from flowing into the load-receiver or bucket after the poising-point is reached.

The supplemental weights are tripped by means of an approximately L-shaped arm 56, formed integral with a plate 57, and the said arm, which extends around the engaging portion or head 42, is interposed between the same and the spring-actuated catch, and it is located above an antifriction-wheel 58, as clearly illustrated in dotted lines in Fig. 5 of the accompanying drawings, when the load-receiver or bucket is raised or in position for receiving the material. The wheel 58, which extends through a slot 59 of the catch, is mounted in a bracket 60, and it forms a beveled projection at the inner face of the catch. When the load-receiver or bucket first moves downward under the influence of a partial load and the supplemental weights and the engaging portion or head 42 is carried downward to the supporting ledge or shoulder 47, the tripping arm or device 56 is carried downward from the position shown in dotted lines in Fig. 5 to a point nearly contiguous to the wheel 58, whereby a slightly further downward movement after the bucket or load-receiver has obtained a full charge of material will cause the catch to be forced outward to withdraw the support from beneath the shoulder 43 of the engaging portion or head 42, and thereby cause the supplemental weights to drop upon the load-receiver or bucket. The bracket, which consists of a bifurcated plate, is adjustably mounted on the lower portion of the catch by means of slots and set-screws, and the wheel is adapted to be raised and lowered to position it properly with relation to the tripping device 56. The tripping of the supplemental weights is also controlled or regulated by means of an adjustable plate 61, mounted on the upper portion of the catch and located above and resting upon the supporting shoulder or ledge 47. This plate 61 has an adjusting-screw 62 swiveled to it, and by rotating the latter the plate 61 may be moved inward and outward to vary the size of the exposed portion of the shoulder or ledge to make the catch more or less sensitive. The adjustable plate 61 is locked at the desired adjustment by means of a jam or lock nut mounted on the adjusting-screw and engaging the back of the catch, as clearly shown in Fig. 14 of the accompanying drawings. When the supplemental weights are carried upward from the position illustrated in Fig. 5 of the accompanying drawings to that shown in dotted lines in the same figure, the beveled side face of the engaging portion or head 42 will contact with the beveled face beneath the shoulder or supporting-ledge of the catch, and the latter will be forced outward to permit the engaging portion or head 42 to pass the shoulder or ledge. As soon as the engaging portion or head has passed the shoulder or ledge the catch will spring inward, and the said engaging portion or head will project over the shoulder or ledge and will be supported by the same when the load-receiver or bucket again moves downward.

The vertically-movable load-receiver or bucket is provided at its lower end with a pair of hinged gates 63, arranged as clearly shown in Fig. 9, and the weight of the material is adapted to hold the gates normally closed. One of the gates is provided at its bottom with a cuff 64, which extends over the other section to close the bottom of the buckets more effectually. The hinges of the buckets each consist of a pair of reinforcing-plates 65 and 66, provided with eyes 67 and 68, arranged one within the other or concentrically and receiving a pintle 69, consisting of a screw; but any other form of hinge may be employed, and the eyes may be arranged to lap over each other, if desired. The screw which passes through the concentric eyes 67 and 68 extends through the wall of the load-receiver or bucket and engages a threaded socket of a plate 70, and the latter is riveted or otherwise secured to the inner face of the said bucket or load-receiver and reinforces the same. The outer portion of the screw or pintle 69 is supported by a bracket or brace 71, mounted on the exterior of the bucket and having an L-shaped lower portion 72, receiving the concentric eyes of the leaves or plates 65 and 66 and provided with a perforation for the reception of the screw or pintle 69. The screw or pintle 69 is provided at its outer end with a head and is engaged by a locking device 73, consisting of an angularly-bent plate conforming to the configuration of the lower portion of the bracket or brace and provided at its lower end with a notched aperture for the reception of the head of the screw. The head of the screw, which is preferably hexagonal, has a plurality of corners, which fit in the notches of the lower end of the locking device, whereby the screw is effectually prevented from accidentally rotating. The upper end of the locking device is provided with a perforation and is keyed or otherwise detachably secured to a stud 74 of the bracket or brace.

The leaves or plates of the hinges are provided with projecting studs 75, arranged in the spaces between upper and lower buffers or stops 76 and 77, adapted to be alternately engaged by the projections or studs 75, whereby the dumping-gates are positively opened and closed. When the dumping-gates are carried downward by the downward movement of the load-receiver or bucket, the studs 75 engage the lower stops or buffers and cause the dumping-gates to open automatically to permit the contents of the load-receiver or bucket to be discharged, and when the load-receiver or bucket is carried upward by the scale-weights the studs or projections 75 engage the upper stops or buffers, and the dumping-gates are automatically closed and are held in such position while receiving the load. The studs or projections have their outer ends reduced to form journals 78 for the reception of wheels 79, which are retained on the journals by keys or other suitable fastening devices and which are adapted to move frictionlessly on the upper and lower buffers. The upper buffers 76 are supported by bars 80, clamped to the uprights or beams of the supporting-frame and provided with central and side lugs extending from the inner faces of the bars 80, as clearly illustrated in Figs. 23 and 24 of the accompanying drawings. Central and side cushions 83 and 84, consisting, preferably, of blocks of rubber, are interposed between the upper buffers and the lugs 81 and 82, and the parts are provided with oppositely-disposed sockets for the reception of the buffers. The central lug is provided with perforations which register with corresponding perforations of the upper buffer and which receive bolts 85 or other suitable fastening devices for suspending the upper buffer. The bolts 85 have their heads arranged in recesses of the lower face of the upper buffer, and these recesses are sufficiently deep to permit the upper buffer to be forced upward without causing the fastening devices to project therefrom. The lower buffers are located above lugs 86 of the bottom frame 3 and are connected with the said lugs by bolts 87, having countersunk heads to prevent them from projecting upward beyond the lower buffers when cushions 88 are compressed. The cushions 88 are interposed between the lugs 86 and the lower buffers, and they are seated in recesses of those parts similar to the cushions of the upper buffers.

The scale is designed more particularly for furnishing coal to stokers for measuring the amount of fuel consumed, and it is held or prevented from operating continuously by means of a latch 89, pivoted at its upper end to the supporting-frame and provided with an enlarged lower end or head and having a shoulder 90, adapted to engage a projection 91 of the adjacent scale-weight. The latch, which is arranged within the path of the projection 91 of the scale-weight, is held in engagement with the same by gravity and is beveled below the supporting-shoulder to enable it to be engaged automatically. When the scale-weights are raised by the downward movement of the load-receiver or bucket, the projection 91 contacts with the lower portion of the pivoted latch and swings the same laterally. When the projection 91 arrives at a point above the supporting-shoulder 90, the latch swings inward automatically and carries the said supporting-shoulder beneath the projection 91, and thereby locks the scale-weights against downward movement and holds the load-receiver or bucket in its lowermost position. The inward movement of the latch may be assisted by a coiled spring 92, connected with a rod 93 and with the supporting-frame by means of a short rod 94. The short rod 94 is threaded and adjustably secured to a bracket 95 by means of nuts located at opposite sides of the bracket, as clearly shown in Fig. 1, and adapted to regulate the tension of the spring to cause the latch to move inward quickly for engaging the projection 91. The rod 93 is connected at its inner end to the spring and is pivoted at its outer end to one arm of a bell-crank lever 96, which has its other arm connected by a link or bar 97ª with a lever or pivoted member 97. The lever or pivoted member 97 is provided with a suitable projection or lug 98, which is engaged by a latch-lever 99, and the latter is fulcrumed on a lever 100. The lever 100 is fulcrumed between its ends at 101, and its inner arm is connected with a coiled spring 102, which normally holds the outer arm of the lever 100 elevated to maintain the latch-lever in position for engaging the pivoted member or lever 97. The coiled spring, which is arranged vertically, as clearly shown in Fig. 1, is connected at its upper end by a link-rod with the inner arm of the lever 100, and its lower end is adjustably connected with a bracket of the supporting-frame by means of a threaded rod and nuts, as shown, but any other suitable means may be employed for regulating the tension of the spring 102. The outer arm of the lever 100 is connected with a suitable operating device, which may consist of a rod or the like, or it may be a flexible connection, such as a cord. The lower end of the latch-lever is inclined to provide an inclined edge 104, arranged adjacent to a rigid support 105 and adapted when the lever 100 is drawn downward by the operating device to ride over the said support, whereby the upper engaging end of the latch-lever will be automatically disengaged from the movable member or lever 97. The operating device 103 preferably passes through a suitable guide 106, and when it is pulled downward it will withdraw the latch from engagement with the projection of the scale-weight, and it will release the said latch to cause the same to reëngage the said projection. By this construction a single operation of the scale is insured when the operating rope or cord is drawn downward, and the scale is prevented from accidentally operating continuously should the operating cord or rod be held down by the operator. In order to cause a second operation of the scale, the operating mechanism must be released or slackened to permit the parts to return to their initial position, and when the outer arm of the lever is swung upward by the coiled spring 102 the automatically-operating latch-lever will be carried into engagement with the movable member or lever 97. The latch-lever is disposed at a slight inclination in order to cause its lower portion to operate as a weight for holding its upper portion into engagement with the lever or member 97.

The upper flared portion of the load-receiver or bucket is located beneath a supply chute or hopper 107, having a contracted lower end, located above a spreader 108 and adapted to be closed by cut-offs 109 to shut off the flow of the material after the poising-point of the scale is reached to prevent any material from passing through the scale without being weighed. The contracted bottom of the supply chute or hopper is formed by inclining the opposite walls inward, and the cut-offs are angularly bent and consist of oppositely-inclined inner and outer portions, the outer portions being provided at their upper edges with eyes 110, receiving pintles 111, suitably secured to the upper portion of the supporting-frame. The outer portions extend a considerable distance above the inner portions of the cut-offs and have weighted arms 112 secured to them, whereby they are closed automatically when the cut-offs are free to move. The arms, which have adjustable weights 113 on their outer portions, are provided at their inner portions with longitudinal slots 114 and have laterally-extending arms 115ª, which are suitably secured to the exterior of the cut-offs. When the load-receiver or bucket moves upward after it has discharged its contents, it engages the weighted arms of the cut-offs and swings the same upward to move the cut-offs outward to open the same. The cut-offs are locked in their open position by means of depending latches 115, pivoted at their upper ends to suitable supports and located above the slots 114 and adapted to extend into the same and engage transverse fastening devices 116, which form suitable shoulders. The latches are provided at their lower ends with suitable notches to receive the transverse fastening devices 116, and they are adapted to hold the cut-offs in their open position until they are tripped by the means hereinafter described.

The vertically-movable load-receiver or bucket is provided at opposite sides of its flared upper portion 5 with brackets 117, having inclined body portions and provided with vertical outer supporting arms or portions 118. Secured to the brackets 117 are adjustable bars 119, located beneath and adapted to engage the outer portions of the weighted arms of the cut-offs to open the latter. The bar 119, which is bifurcated at its upper end to receive an antifriction roller or wheel 120, is provided with upper and lower slots 121 and 122, and the lower slot receives clamping-screws 123 or other suitable fastening devices for securing the bar 119 to the bracket 112. The lower end of the bar 119 is engaged by an adjusting-screw 124, mounted on the lower portion of the upright outer part of the bracket 117 and adapted to support the said bar 119. The upper slot 121 receives fastening devices 125 for securing a tripping device 126 to the lifting-bar 119. The tripping device consists of a bar provided with a longitudinal slot 127 to receive the weighted arm of the cut-off and having an antifriction roller or wheel 128 mounted on its upper end in the slot or bifurcation. When the load-receiver or bucket is raised, as illustrated in dotted lines in Fig. 17 of the accompanying drawings, the antifriction-rollers of the tripping devices are located within recesses 129 of the latches 115, and when the load-receiver or bucket moves downward they engage the shoulders or bottom walls of the recesses and swing the latches 115 inward, thereby releasing the cut-offs, which are swung to their closed positions by their weighted arms. The latch 115 tapers from bottom to top, and the tripping-roller 128 bears against the outer surface of the latch during the entire movement of the load-receiver or bucket below the poising-point, thus making it impossible for the latch to reëngage the pin 116 of the arm 112 should the latter fail to move downward immediately upon being released. In order to effectually prevent the cut-offs 109 accidentally remaining open after the bucket has received its full charge, the tripping device 126 is provided at the upper portion of the longitudinal slot 127 with a transverse pin 145, located above the arm 112 of the cut-off and adapted to engage the said arm and force the same downward. Both arms 112 are simultaneously moved downward, and the cut-offs 109 are positively closed before the hinged gates 63 can open.

These transverse pins also operate to lock the cut-offs 109 in their closed position while the load-receiver or bucket is in its lowermost or discharging position, and they prevent the cut-offs from opening until the load-receiver or bucket moves upward. During the first portion of the downward movement of the load-receiver or bucket when the scale-weights are partially counterbalanced by the supplemental weights the antifriction wheels or rollers 128 are carried downward to points nearly contiguous to the bottom walls or shoulders of the recesses 129, so that as soon as the load-receiver or bucket moves downward under the influence of a full charge of material and immediately upon the release of the supplemental weights the cut-offs will be instantly tripped to prevent any excess of material falling into the load-receiver or bucket. The spreader 108 consists of a transverse bar V-shaped in cross-section and provided at its ends with arms 146 or other suitable means for attaching it to the supporting-frame, and it presents an upper apex and inclined sides to the falling material and spreads the same and receives the impact of such material and prevents such impact from prematurely forcing the load-receiver or bucket downward.

The arms 146 of the spreader extend upward from the ends of the same and are supported by suitable pivots 147, the latter being located above the body of the spreader, which is sufficiently weighted, as shown, to hold it normally in a central position. The pivoting of the spreader in this manner permits the same to swing automatically in either direction to allow large lumps of material or other obstructions to pass it, and by this construction all liability of coal or other material collecting upon the spreader and choking and interfering with the operation of the scale is prevented.

When the cut-offs are closed, the upper edges of their inner portions are located beneath an agitator 130, substantially V-shaped in cross-section, and presenting an upper apex to the material and having inclined sides to which are secured adjustable plates 131, adapted to vary the size of the agitator. The agitator, which is mounted on a bar 132, is connected by the same with a pair of levers 133 and is adapted to be raised by the means hereinafter described to agitate the material within the lower portion of the supply chute or hopper and at the same time to increase the size of the supply-passage to prevent such material from lodging therein. The bar 132 is square in cross-section to fit within the angle of the agitator and to conform to the configuration of the same, and its ends are reduced and pass through slots 134 of the walls of the feed chute or hopper, the levers 133 being located on the exterior of the same. The agitator is raised by hand; but the weight of the material resting upon it will swing it downward. The outer ends of the levers 133 are connected by a transverse rod 135, which is attached to one end of an operating-cord 136, passing over a pulley 137 and adapted to be pulled to swing the agitator upward. The pulley, which is mounted within a suitable block or casing, is supported by an arm 138 of the supporting-frame; but any other suitable means may be employed for oscillating the levers, which are connected with the agitator.

The agitator and the contracted lower portion of the supply chute or hopper 107 receive the impact of the coal or other material, and the falling of the same into the supply-chute or hopper will not affect the accuracy of the scale. The lower contracted portion of the hopper is provided with opposite inclined downwardly-converging walls 150, located between the cut-offs and the agitator and arranged to receive the material.

The cut-offs are located close to the load-receiver or bucket when the latter is elevated, and in practice the material is adapted to bank up over the load-receiver or bucket, so that the space between the supply-chute or hopper and the load-receiver or bucket will be practically entirely filled with the material constituting properly a portion of the charge, so that there will be no unweighed material in the air when the poising-point is reached. The cut-offs are adapted to cut their way through the material, and only sufficient material to counterbalance the scale-weights will pass downward at each operation of the scale. In order to cause the material of a charge to bank up properly above the load-receiver or bucket, the latter is provided with a pair of adjustable plates 139, forming opposite side walls and hinged at their upper edges and adjustably connected with the adjacent walls of the load-receiver or bucket by means of slotted arms 140. The hinges 141, which connect the upper edges of the plates 139 to the load-receiver or bucket, are located beneath guards 142, which prevent the hinges from being injured by the falling material. The slotted arms 140 are pivoted at their inner ends to the plates 130, and they extend outward through openings of the adjacent walls of the load-receiver or bucket and are adjustably secured to exterior brackets 143 by suitable clamping devices 144, preferably consisting of bolts having winged nuts; but any other suitable means may be employed for securing the hinged plates at the desired adjustment. By adjusting the hinged plates a given charge of material may be caused to rise to the desired extent within the load-receiver or bucket.

What I claim is—

1. In an automatic scale capable of continuous operation, a load-container, a weight having a permanent flexible connection therewith, and a locking means for automatically engaging the weight and preventing upward operative movement of said load-container until disengagement of the locking means by means disconnected from the scale mechanism.

2. In an automatic scale capable of continuous operation, a load-container, a weight having a permanent flexible connection therewith, and a locking means for automatically engaging the weight and preventing upward operative movement of said load-container until disengagement of the locking means, said locking means being so disposed as to permit partial returning movement of the load-container before engaging with and stopping the movement of the weight.

3. The combination of a vertically-movable load-receiver, scale-weights arranged at opposite sides of the load-receiver and consisting of heavy plates and provided with sockets or wells extending downward from the tops of the plates and located at the outer faces thereof, weights removably arranged in the sockets or wells, and means for connecting the scale-weights with the load-receiver, substantially as described.

4. The combination of a vertically-movable load-receiver having studs or projections, scale-weights consisting of heavy plates having openings receiving the studs, wheels, and flexible connections arranged on the wheels and attached to the weights and extending into the openings thereof and connected with the studs or projections, substantially as described.

5. The combination of a supporting-frame having upright flanged beams arranged to form inner and outer ways, a vertically-movable load-receiver provided with guideways engaging the flanges of one set of the ways, and the vertically-movable scale-weights connected with the load-receiver and provided with guide-wheels arranged on the flanges of the other set of ways, substantially as described.

6. The combination of a frame provided with inner and outer vertically disposed guides, the vertically-movable load-receiver provided with wheels arranged on the inner guides, the vertically-movable scale-weights consisting of heavy plates provided with openings, wheels mounted on the scale-weights and arranged to run on the outer guides, the flexible connections attached to the scale-weights and extending to the openings thereof and connected at that point to the load-receiver, and wheels receiving the flexible connections, substantially as described.

7. The combination of an automatic scale capable of continuous operation and provided with a vertically-movable element, a latch arranged in the path of the vertically-movable element and arranged to engage the same automatically for locking the scale out of operation, manually-actuated mechanism connected with the latch for withdrawing the same from engagement with the said element to release the scale, and means for automatically releasing the latch and for returning the same to its engaging position during the scale-releasing movement of the said mechanism, substantially as described.

8. The combination of a vertically-movable load-receiver, scale-weights connected therewith, a latch for locking the load-receiver against vertical movement, a movable member connected with the latch, a latch-lever fulcrumed between its ends and having one arm engaging the movable member, hand-actuated operating mechanism pivotally connected with the latch-lever, and means located in the path of the latch-lever for automatically swinging the other arm of the latch-lever when the operating mechanism is actuated by hand, whereby the latch-lever is disengaged from the movable member, substantially as described.

9. The combination of a vertically-movable load-receiver, scale-weights connected therewith, a latch for locking the load-receiver against vertical movement, a movable member connected with the latch, an upright latch-lever fulcrumed between its ends and provided at its upper end with means for engaging the movable member, and having an inclined edge at its lower end, a support arranged to be engaged by the inclined edge of the latch-lever, whereby the upper end of the latter will be automatically disengaged from the movable member when the latch-lever is drawn downward, and operating mechanism for actuating the latch-lever, substantially as described.

10. The combination of a vertically-movable load-receiver, scale-weights connected therewith, a latch for locking the load-receiver against vertical movement, a movable member connected with the latch, the lever 100, the latch-lever fulcrumed on the lever 100 and provided at its upper end with means for engaging the movable member, and having an inclined edge at its lower portion, a support arranged to be engaged by the inclined edge of the latch-lever to swing the upper end of the same out of engagement with the movable member when the said latch-lever is drawn downward, a spring connected with the lever 100 for raising the latch-lever, and operating mechanism for drawing the latch-lever downward, substantially as described.

11. The combination of a vertically-movable load-receiver, scale-weights connected therewith, a latch for locking the load-receiver against vertical movement, a spring-actuated rod connected with the latch, a bell-crank lever having one of its arms connected with the rod, a movable member connected with the other arm of the bell-crank lever, the lever 100 fulcrumed between its ends, a spring connected with the inner end of the lever 100 and adapted to raise the outer arm, a latch-lever fulcrumed on the outer arm of the lever 100, and provided at its upper end with means for engaging the movable member and having an inclined edge at its lower portion, a support receiving the inclined edge, and operating mechanism connected with the lever 100 and adapted to swing the outer arm downward, substantially as described.

12. The combination of a vertically-movable load-receiver, a scale-weight connected with the same, a supplemental weight for partially counterbalancing the scale-weight and to impart an additional weight on the load-receiver when the poising-point is reached, an approximately horizontal arm pivoted at its outer end and connected at its inner end to the supplemental weight, and means for supporting and tripping the supplemental weight, substantially as described.

13. The combination of a vertically-movable load-receiver, scale-weights connected therewith, supplemental weights engaging the load-receiver to partially counterbalance the scale-weights and to impart an additional impetus to the load-receiver when the poising-point is reached, oscillating arms connected with the supplemental weights, means for connecting the arms to cause the same to swing in unison, and mechanism for supporting and tripping one of the arms, substantially as and for the purpose described.

14. The combination of a vertically-movable load-receiver, scale-weights connected therewith, supplemental weights for engaging the load-receiver to partially counterbalance the scale-weights and to impose an additional load on the load-receiver when the poising-point is reached, arms connected together and pivotally connected with the supplemental weights, a catch arranged to engage one of the arms to support the supplemental weights, and means for tripping the catch, substantially as described.

15. The combination of a load-receiver, scale-weights connected therewith, supplemental weights, oscillating arms pivoted to the supplemental weights and provided with curved slots, projections carried by the weights and arranged in the slots, and means for supporting and tripping one of the arms, substantially as and for the purpose described.

16. The combination of a supporting-frame, a vertically-movable load-receiver, scale-weights connected therewith, a horizontal shaft journaled in suitable bearings and supported by the frame, oscillating arms fixed to the shaft and located at opposite sides of the load-receiver, supplemental weights connected with the arms and arranged to engage the load-receiver to partially counterbalance the scale-weights and to impose an additional load on the load-receiver when the poising-point is reached, and means for supporting and tripping one of the arms, substantially as described.

17. The combination of a vertically-movable load-receiver, scale-weights connected therewith, supplemental weights, oscillating arms connected with the supplemental weights, a catch arranged to engage one of the arms to support the supplemental weights, and a tripping device mounted on the load-receiver and extending between the catch and the adjacent arm and adapted to engage the former, substantially as described.

18. The combination of a load-receiver, scale-weights connected therewith, supplemental weights for engaging the load-receiver, oscillating arms connected with the supplemental weights, one of the arms being provided with an engaging portion or head, a catch arranged in the path of the engaging portion or head to support the supplemental weights and provided with an antifriction-wheel forming a projection, and a tripping device carried by the load-receiver and arranged to engage the wheel, substantially as described.

19. The combination of a load-receiver, scale-weights connected therewith, supplemental weights for engaging the load-receiver, arms connected with the supplemental weights, one of the arms being provided with an engaging portion or head, a catch arranged in the path of the engaging portion or head and provided with a shoulder to receive the same, an adjustable device mounted on the catch for varying the area of the exposed portion of the shoulder, and means for tripping the catch, substantially as described.

20. The combination of a load-receiver, scale-weights connected therewith, supplemental weights for engaging the load-receiver, oscillating arms connected with the supplemental weights, one of the arms being provided with a head or engaging portion, a catch pivoted between its ends on a suitable support and having a lower arm for engaging the same, a spring connected with the catch for holding the same in the path of the engaging portion or head, and a tripping device, substantially as described.

21. The combination of a load-receiver, scale-weights connected therewith, supplemental weights for engaging the load-receiver, arms connected with the supplemental weights, a catch pivoted between its ends and having upper and lower arms, the lower arm forming a stop and the upper arm being provided with a supporting-shoulder and having a slot, an antifriction-wheel projecting through the slot, a spring connected with the upper arm of the catch, and a tripping device arranged to engage the wheel, substantially as described.

22. The combination of a load-receiver, scale-weights connected therewith, supplemental weights for engaging the load-receiver, means for connecting the supplemental weights to cause the latter to move in unison, a catch arranged in the path of the said means and adapted to support the supplemental weights, and a tripping device for throwing the catch out of such engagement, substantially as described.

23. The combination of a load-receiver, scale-weights connected therewith, supplemental weights for engaging the load-receiver consisting of heavy plates having sockets or wells and provided with removable weights, means for connecting the supplemental weights for causing the same to move in unison, a catch arranged in the path of the said means for supporting the supplemental weights, and a tripping device for engaging the catch, substantially as described.

24. The combination of a load-receiver, a supporting-frame, scale-weights connected with the load-receiver, supplemental weights for engaging the latter, oscillating arms connected with the supplemental weights, one of the arms being provided with a head, a catch arranged in the path of the head and provided with a laterally-extending arm, a spring connected with the laterally-extending arm, an adjustable rod connecting the spring with the frame, and a tripping device, substantially as described.

25. The combination of a supporting-frame, a vertically-movable load-receiver, scale-weights connected therewith, gates hinged to the load-receiver and provided with eccentrically-arranged projections, upper and lower bars provided with lugs, upper and lower buffers movably connected with the lugs and located above and below the projections, and cushions interposed between the buffers and the lugs, substantially as described.

26. The combination of a load-receiver, scale-weights connected therewith, dumping-gates, leaves or sections secured to the dumping-gates and provided with concentric eyes, a screw passing through the concentric eyes and engaging the load-receiver, a bracket or brace mounted on the load-receiver and supporting the screw, and a locking device secured to the bracket and engaging the screw, substantially as described.

27. The combination of a load-receiver, gates, leaves or sections secured to the gates and provided with concentric eyes, a plate arranged within the load-receiver and having a threaded socket, a screw passing through the concentric eyes and engaging the threaded socket of the said plate, and a bracket mounted on the exterior of the load-receiver and supporting the screw at the outer end thereof, substantially as described.

28. The combination of a vertically-movable load-receiver, a supply chute or hopper located above the same having opposite inclined walls, an agitator arranged within the chute or hopper above the inclined walls and coöperating with the same to receive the impact of the material to prevent the latter from affecting the accuracy of the scale, cut-offs located at opposite sides of the latter and extending beneath the agitator, and scale-weights connected with the load-receiver, substantially as described.

29. The combination of a vertically-movable load-receiver, scale-weights connected therewith, a supply chute or hopper located above the load-receiver, an agitator arranged within the chute or hopper at the bottom thereof and coöperating with the lower walls of the same to receive the impact of the material, said agitator being adapted to be raised and lowered to free the material, cut-offs extending beneath the agitator, and a spreader located beneath the cut-offs, substantially as described.

30. The combination of a vertically-movable load-receiver, a supply chute or hopper located above the same, a vertically-movable agitator having oppositely-disposed upper inclined faces and coöperating with the lower walls of the chute or hopper to receive the impact of the material, means for raising the agitator to free the material, and the cut-offs extending to points beneath the agitator, substantially as described.

31. The combination of a vertically-movable load-receiver, a supply chute or hopper located above the same, a substantially V-shaped agitator arranged horizontally within the supply chute or hopper and presenting upper inclined faces and coöperating with the lower walls of the chute or hopper to receive the impact of the material, means for raising the agitator, and the oppositely-disposed cut-offs extending to points beneath the agitator, substantially as described.

32. The combination of the vertically-movable load-receiver, a supply chute or hopper located above the same and provided at opposite sides with slots, the agitator located within the hopper or chute and provided with a bar extending through the slots, cut-offs extending to points beneath the agitator, the exterior levers connected with the bar of the agitator, and operating mechanism connected with and adapted to raise the lever, substantially as described.

33. The combination with a vertically-movable load-receiver of a supply chute or hopper located above the same, an agitator arranged within the chute or hopper and interposed between the falling material and the load-receiver and adapted to receive the impact of the falling material, said agitator being capable of vertical movement to free the material and cause the same to feed downward and cut-offs located at opposite sides of the agitator and coöperating with the same to close the bottom of the chute or hopper, substantially as described.

34. The combination with a vertically-movable load-receiver, of a supply chute or hopper located above the same and provided with oppositely-inclined portions, a fixed spreader located below and spaced from the said inclined portions of the hopper, cut-offs operating between the spreader and the said inclined portions, and an agitator operating within the chute or hopper and located between the inclined portions thereof and at a point above the cut-offs when the latter are closed and capable of vertical movement, substantially as described.

35. The combination of a vertically-movable load-receiver, a movable cut-off provided with means for automatically closing it, a latch arranged to hold the cut-off open, a vertically-movable tripping device fixed to and carried by the load-receiver and adapted to throw the latch out of engagement with the cut-off when the said load-receiver moves downward under the influence of a full charge, and means carried by the load-receiver for positively engaging the cut-off to open and close the same, substantially as described.

36. The combination of a vertically-movable load-receiver, a movable cut-off provided with a weight for closing it automatically, a latch arranged to hold the cut-off in its open position, a vertically-movable lifting device mounted on and carried by the load-receiver in its vertical movement and arranged to raise the weight and open the cut-off when the load-receiver moves upward, and means carried by the load-receiver for tripping the cut-off and for positively engaging the latter to close the same, substantially as described.

37. The combination of a vertically-movable load-receiver, a movable cut-off provided with a weighted arm for closing it automatically, a latch for holding the cut-off open, a vertically-movable lifting-bar carried by the load-receiver and located beneath and adapted to raise the weighted arm, and a vertically-movable tripping device consisting of a bar or member fixed to and carried by the load-receiver and arranged to engage the latch and the weighted arm, substantially as described.

38. The combination of a vertically-movable load-receiver, a hinged cut-off provided with a weighted arm, a latch arranged to hold the weighted arm in an elevated position, a lifting-bar carried by the load-receiver and arranged to raise the arm, and a tripping device consisting of a bar having an opening to receive the weighted arm and provided with means for engaging the latch, substantially as described.

39. The combination of a vertically-movable load-receiver, a hinged cut-off having a weighted arm for closing it, a latch located above and adapted to hold the weighted arm in an elevated position and provided with a shoulder, a bracket mounted on the load-receiver, a lifting-bar secured to the bracket and arranged to engage the arm, and a tripping device consisting of a bar connected with the lifting-bar, and arranged to engage the shoulder of the latch when the load-receiver moves downward, substantially as described.

40. The combination of a vertically-movable load-receiver, a supply chute or hopper located above the same, hinged cut-offs arranged at opposite sides of the chute or hopper and provided with weighted arms for closing them, latches arranged to engage the weighted arms for holding the cut-offs open, vertically-movable tripping devices fixed to and carried by the load-receiver for releasing the cut-offs when the load-receiver moves downward, and lifting-bars also carried by the load-receiver for raising the weighted arms, substantially as described.

41. The combination of a load-receiver, scale-weights connected therewith, a supply chute or hopper, and a spreader pivotally mounted at the top of the load-receiver and adapted to receive the impact of falling material and to swing aside to permit large lumps to pass it, substantially as described.

42. The combination of a vertically-movable load-receiver, a cut-off having a weighted arm for closing it, a latch for holding the cut-off open, a lifting device for raising the arm to open the cut-off, and a tripping device carried by the load-receiver and arranged to engage the latch and provided with means for engaging the weighted arm after the same has been released, whereby the cut-off is positively closed, substantially as described.

43. The combination of a vertically-movable receiver, a cut-off, an upright latch for holding the cut-off open, and a vertically-movable tripping device fixed to and carried by the load-receiver and arranged to engage both the latch and the cut-off, said tripping device being in engagement with the latch while the load-receiver is traveling below the poising-point, whereby the latch is positively held away from its engaging position, substantially as described.

In testimony that I claim the foregoing as my own I have hereto affixed my signature in the presence of two witnesses.

PEETE B. CLARKE.

Witnesses:
HENRY H. GRAFF,
THOMAS HOLDEN, Jr.